Patented Apr. 11, 1933

1,903,620

UNITED STATES PATENT OFFICE

FREDERICK JULIUS ESSLINGER, OF PETROLEUM, HUBBARD TOWNSHIP, TRUMBULL COUNTY, OHIO, ASSIGNOR TO THE PETROLEUM IRON WORKS CO. OF OHIO, OF SHARON, PENNSYLVANIA, A CORPORATION OF OHIO

WELDROD COATING

No Drawing.   Application filed June 14, 1930.   Serial No. 461,265.

All weldrod coverings of the prior art with which I am familiar suffer the disadvantage that too much gas is evolved and, at any rate, that gas is carried into the weld and not being completely removed makes for a porous deposit; that the slag because of its relatively high specific gravity does not readily separate itself and, hence, forms undesirable and objectionable inclusions in the weld; that the slag hardens too quickly and chills at the colder melting points of weld metal and parent metal, thus forming a groove at the juncture and undercutting the parent metal.

In extended experimentation having for its ultimate object the elimination of the defects and disadvantageous conditions aforestated, I have found that by following the procedure hereinafter described and claimed, that I can remedy the defects of the general practice and secure remarkable results in electric fusion welding.

The nature of the invention consists in sharply controlling the melting point of the flux coating by the use of a component or components having relatively low melting point and having strong affinity for acid radicals and serving to unite with sulphur and phosphorous and so purify the metal of these undesirables and, withal, effective to establish a gaseous envelope to protect the arc; it being essential that there should be an excess of acid radicals around the arc over the number of basic radicals. The acid radicals serve to combine with the basic radicals and it is desirable that this reaction should be complete. The acid radicals may be supplied from glass, sodium silicate, and kaolin or its equivalent, when disassociated at high temperature. The basic radicals are supplied from sodium carbonate and ferro-manganese when disassociated at high temperatures. The characteristic feature of the new acid slag forming material is the use of soda ash to govern the melting point of the coating and slag and to provide the gaseous envelope.

In the practice of the invention I prepare a fusible coating or covering, unstable at high temperatures, containing a carbonate of an alkali or alkaline earth elements together with sodium silicate, and silicate of the alkali and alkaline earth elements (kaolin or bauxite) and a suitable deoxidizing agent such as ferro-manganese or aluminum, which covering will be partly disassociated by the heat of the arc and will produce gases which will surround the arc and protect the weld metal being deposited from oxidation and contamination, the remainder of the covering fusing and forming a flux or slag which will combine with impurities in the metal being deposited and float with them on top of the puddle of molten metal freeing it from gases and impurities. A composition which has given excellent results in service consists of the following ingredients in the proportions stated more or less:

| | |
|---|---|
| Kaolin | 7 |
| Sodium silicate | 41 |
| Glass | 22 |
| Ferro-manganese | 22 |
| Soda ash | 6 |
| Water | 2 |

By preference the sodium silicate is used both in the form of powder and in the form of liquid. The liquid sodium silicate has a strong alkaline reaction due to the presence of an excess of sodium oxide which becomes free to combine at high heat the same as the decomposition product of soda ash $Na_2O$. The solid sodium silicate and the glass do not give off basic radicals on decomposition; the kaolin probably gives off basic and acid radicals under high heat. The ferro-manganese combines with iron oxide, the iron going into the weld. The manganese oxide combines with an acid radical $SiO_2$ forming manganese silicate which goes into the slag as do the sodium salts. A small proportion of the manganese will alloy with the iron of the weld thereby increasing the tensile strength and toughness. The slag consists of manganese silicate, iron silicate, calcium silicate, sodium silicate, sodium phosphate, sodium sulphate and traces of silicates of other elements. The soda ash ($Na_2CO_3$) is preferably employed in the form of a dust free, granulated, dense element containing the usual or common impurities such as sodium chloride, sodium sulphates, calcium carbonate and magnesium carbonate. The specific gravity of soda ash is 2.476 and its melting point is about 1565° F.

Having described the invention, what is claimed is:

1. A composition for coating weldrods, comprising the following components in substantially the proportions stated, kaolin 7., sodium silicate 41., glass 22., ferro-manganese 22., soda ash 6. and water 2.

2. A weldrod having a coating formed from a plastic composition comprising the following components in substantially the proportions stated, kaolin 7., sodium silicate 41., glass 22., ferro-manganese 22., soda ash 6. and sufficient moisture to effect a mixture.

In testimony whereof I affix my signature.

FREDERICK JULIUS ESSLINGER.